2,909,516

MONOAZO DYESTUFFS

Jean-Pierre Jung, Riehen, near Basel, Switzerland, assignor to J. R. Geigy A.-G., Basel, Switzerland No Drawing. Application February 14, 1958
Serial No. 715,190

Claims priority, application Switzerland
February 19, 1957

8 Claims. (Cl. 260—196)

The invention concerns monoazo dyestuffs containing neither sulphonic acid nor carboxylic acid groups, which are suitable for the dyeing of wool and similar natural and synthetic fibres in pure, fast-to-light orange to red shades. It also concerns processes for the dyeing of these fibres using the new dyestuffs and, as industrial product, the material fast-dyed with the aid of these dyestuffs.

It has been found that valuable monoazo dyestuffs are obtained if the diazo compound of an amine containing no sulphonic acid and carboxylic acid groups of the general Formula I

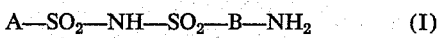

$$A-SO_2-NH-SO_2-B-NH_2 \qquad (I)$$

wherein A represents a radical of the benzene or naphthalene series and B represents a benzene radical, whereby the amino group must be in the ortho position to a sulphonyl substituent, is coupled in an acid medium with a 2-aminonaphthalene compound having no sulphonic acid and carboxylic acid groups which couples in the 1-position, of the general Formula II

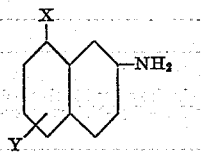

wherein X represents H or OH, and Y represents a sulphonyl substituent selected from the group consisting of —SO$_2$-alkyl, —SO$_2$-aryl, —SO$_2$—O-aryl and —SO$_2$—R radicals, wherein R represents a secondary amino group.

Valuable dyestuffs according to the present invention are derived chiefly from diazo components of the Formula I in which the amino group is in the o-position to the disulphimide group. It can, however, also be in the o-position to another sulphonyl substituent. In the particularly valuable dyestuffs, Y in Formula II represents the

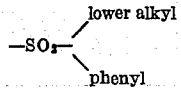

group. Also diazo components in which the radical A represents either the unsubstituted or the chloro or methyl substituted phenyl radical produce the most valuable dyestuffs.

The aromatic rings, in particular A and B, in the dyestuffs according to the present invention can contain, for example, the following non-ionogenic substituents: alkyl groups such as the methyl, ethyl, n- or t-butyl group; trifluoromethyl group; 1.2-alkylene groups such as the tetramethylene group; ether groups such as the methoxy, ethoxy, phenyloxy, alkylphenyl or halogenphenyloxy groups; the alkylthio group or phenyl thio groups, alkylphenylthio groups or halogenphenylthio groups; alkyl and aryl sulphoxide and sulphone groups, sulphonic acid amide groups derived from secondary amines as well as sulphonic acid aryl ester groups; the cyano group; carboxylic acid ester groups; halogens.

Radicals of the benzene and naphthalene series are used as aromatic radicals A. A can be for example the radical of a benzene sulphonic acid, of a toluene or xylene sulphonic acid, of a cymol sulphonic acid, of a mono- or di-halogenbenzene sulphonic acid, of a halogen alkylbenzene sulphonic acid, of a naphthalene sulphonic acid, of a diphenyl sulphonic acid, of a tetrahydronaphthalene sulphonic acid.

Diazo components used according to the present invention contain as the benzene ring B advantageously the radical of a 2-aminobenzene-1-sulphonic acid, for example the radical of a 4- or 5-halogen-2-aminobenzene-1-sulphonic acid, of a 4-alkyl or 4-alkoxy-2-aminobenzene-1-sulphonic acid, of a 4- or 5-acylamino-2-aminobenzene-1-sulphonic acid, of a 4- or 5-alkyl or aryl sulphonyl-2-aminobenzene-1-sulphonic acid. The benzene ring B can also be derived, however, from a 3-amino-4-aryl- or -alkyl sulphonylbenzene-1-sulphonic acid, a 3-amino-4-sulphonic acid aryl ester-benzene-1-sulphonic acid, or a 3-amino-4-sulphonic acid amide-benzene-1-sulphonic acid.

The diazo components used according to the present invention are obtained by known methods by reacting in a weakly alkaline medium suitably substituted aryl or alkyl sulphonic acid chlorides with solutions of the alkali metal salts of suitably substituted aryl sulphonic amides while reducing the nitro groups to amino groups or saponifying acylomino groups.

The diazo components are diazotised advantageously by the indirect method by dropping aqueous solutions containing the alkali metal salts of the diazo components and the necessary amount of alkali nitrite into cold excess mineral acid.

In the coupling components of the general Formula II, the periposition to the coupling can be either free or hydroxyl substituted. The sulphonyl substituent Y should not dissociate acid in water, that is should not be a sulphonic acid or an acylated sulphonic acid amide group; it should never, i.e. even in an alkaline medium at a higher pH value, be a salt-forming sulphonyl substituent, that is for example an alkyl, or aryl sulphonyl group, a sulphamide group derived from a secondary amine, e.g. a dimethyl, diethyl, dibutyl, N-methyl-phenyl, N-ethyl-phenyl, N-butyl-phenyl, dicyclohexyl amide group or a sulphonic acid arylester group, e.g. the sulphonic acid phenyl ester, methylphenyl ester or chlorophenyl ester group. If X is the hydroxyl group, then Y is advantageously in the 6-position.

Thus, azo components used according to the present invention are for example, derivatives of 2-aminonaphthalene-5-, -6- or -7-sulphonic acid and 2-amino-8-hydroxynaphthalene-6-sulphonic acid as defined above.

The coupling is performed in acid, preferably aqueous organic solution. For example the azo componets are dissolved in concentrated lower fatty acids with the addition of lower alcohols and possibly mineral acid, lower ketones or amides of lower fatty acids and mixed with the aqueous solutions or pastes of the diazo compounds. On completion of the coupling, water is added to dilute, any organic solvent is removed with steam and the colour salt is isolated with sodium chloride.

The new dyestuffs are orange to red powders which generally dissolve easily in hot water with the corresponding colour and which dye wool and similar natural and synthetic fibres such as silk, lanital, polypeptide and polymethane fibres from a neutral to weakly acid bath in pure orange to red shades which are fast to light and wet.

The new dyestuffs are very suitable also for the printing of textiles. They are particularly suitable for the printing of wool by the so-called "Vigoureux" printing process.

The following examples serve to illustrate the invention without limiting it in any way. Where not otherwise stated, parts are given as parts by weight and the temperatures are in degrees centigrade. The relationship of parts by weight to parts by volume is as that of grammes to cubic centimetres.

EXAMPLE 1

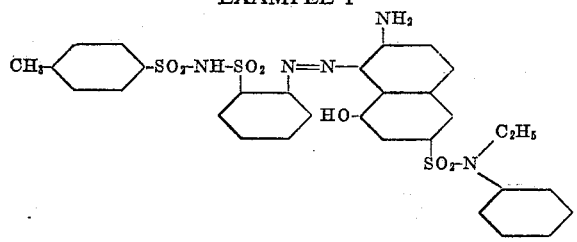

32.6 parts of 2-amino-4'-methyl-1.1'-diphenyl disulphimide in the form of the sodium salt are dissolved in 1000 parts of water, 6.9 parts of sodium nitrite are added and the 40° warm solution is added dropwise to 30 parts of concentrated hydrochloric acid and 100 parts of ice at 0° to 8°. After stirring for one hour at 0° and decomposition of some excess nitrous acid, the colourless diazo suspension is poured into a solution of 34.2 parts of 2-amino-8-hydroxynaphthalene-6-sulphonic acid-N-ethyl-N-phenyl amide in 300 parts of glacial acetic acid and 500 parts of ethanol. Coupling occurs immediately and the mixture turns red. After stirring for 6 hours, it is diluted with 2000 parts of hot water, 200 parts of sodium chloride are added and the red dyestuff which has precipitated is drawn off under suction, washed on the suction filter with a 2% aqueous solution of sodium chloride until the reaction is neutral and dried at 80°.

The brownish-red dyestuff dissolves in hot water with a yellowish-red colour and dyes wool from a boiling bath containing ammonium sulphate in level, pure, very fast-to-light yellowish-red shades.

The following Table 1 contains some similar monoazo dyestuffs which are produced in the same way and which also dye wool in fast to light shades from a neutral to weakly acid bath: column 1 shows the diazo components and column 2 the azo components used. Column 3 gives the shade of wool dyeing from a neutral to acetic acid bath.

*Table 1*

| No. | Parts | Diazo component | Parts | Azo component | Colour of wool dyeing |
|---|---|---|---|---|---|
| 1 | 36.6 | 2 - amino - 3',4' - tetramethylene - 1,1' - diphenyl disulphimide. | 32.8 | 2 - amino - 8 - hydroxynaphthalene - 6 - sulphonic acid-N-methyl-N-phenyl amide. | Yellowish red. |
| 2 | 36.2 | 2-aminophenyl-2'-naphthyl disulphimide. | 32.8 | ---do--- | Do. |
| 3 | 36.2 | ---do--- | 29.4 | 2 - amino - 8 - hydroxynaphthalene - 6 - sulphonic acid-N,N-diethyl amide. | Do. |
| 4 | 34.7 | 2 - amino - 4' - chloro - 1,1' - diphenyl disulphimide. | 35.6 | 2 - amino - 8 - hydroxynaphthalene - 6 - sulphonic acid-N-ethyl-N-o-tolyl amide. | Do. |
| 5 | 38.1 | 2 - amino - 3',4' - dichloro - 1,1' - diphenyl disulphimide. | 34.2 | 2 - amino - 8 - hydroxynaphthalene - 6 - sulphonic acid-N-ethyl-N-phenyl amide. | Do. |
| 6 | 38.1 | ---do--- | 40.6 | 2 - amino - 8 - hydroxynaphthalene - 6 - sulphonic acid-N-methyl-N-(4''-methyl sulphonyl phenyl)-amide. | Do. |
| 7 | 38.1 | 2-amino-4,4'-dichloro-1,1'-diphenyl disulphimide. | 32.8 | 2 - amino - 8 - hydroxynaphthalene - 6 - sulphonic acid-N-methyl-N-phenyl amide. | Do. |
| 8 | 39.4 | 2 - amino - 4 - trifluoro - methyl - 4' - methyl - 1,1'-diphenyl disulphimide. | 32.8 | ---do--- | Red. |
| 9 | 41.8 | 2 - amino - 4 - ethyl - sulphonyl - 4' - methyl - 1,1'-diphenyl disulphimide. | 32.8 | ---do--- | Do. |
| 10 | 38.3 | 2 - amino - 5 - acetyl - amino - 4' - methyl - 1,1'-diphenyl disulphimide. | 32.8 | ---do--- | Do. |
| 11 | 44.5 | 2 - amino - 5 - benzoyl - amino - 4' - methyl - 1,1'-diphenyl disulphimide. | 32.8 | ---do--- | Do. |
| 12 | 36.1 | 2 - amino - 4 - methyl - 4' - chloro - 1,1' - diphenyl-disulphimide. | 32.8 | ---do--- | Yellowish red. |
| 13 | 49.7 | 2-amino-4-sulphonic acid-N-ethyl phenyl amide-4'-methyl-1,1'-diphenyl disulphimide. | 32.8 | ---do--- | Do. |
| 14 | 46.6 | 3 - amino - 4 - (p - tolylsulphonyl) - 1,1' - diphenyl disulphimide. | 31.0 | 2 - amino - 8 - hydroxynaphthalene - 6 - sulphonic acid-N-ethyl-N,β-hydroxy-ethyl amide. | Red. |
| 15 | 41.6 | 2 - amino - 5,2',5' - trichloro - 1,1' - diphenyl disulphimide. | 31.0 | ---do--- | Do. |
| 16 | 32.6 | 2-amino-4'-methyl-1,1'-diphenyl disulphimide. | 40.2 | 2 - amino - 8 - hydroxynaphthalene - 6 - sulphonic acid-N,N-dicyclohexyl amide. | Do. |
| 17 | 40.5 | 2 - amino - 4' - methyl sulphonylamino - 1,1'-diphenyl disulphimide. | 40.2 | ---do--- | Do. |
| 18 | 40.35 | 2 - amino - 4' - chloracetylamino - 1,1' - diphenyl disulphimide. | 32.8 | 2 - amino - 8 - hydroxynaphthalene - 6 - sulphonic acid-N-methylphenyl amide. | Do. |
| 19 | 39.1 | 2 - amino - 3' - sulfamido - 1,1' - diphenyl disulphimide. | 40.4 | 2 - amino - 8 - hydroxynaphthalene - 6 - sulphonic acid-N-benzyl-N-phenyl amide. | Do. |
| 20 | 39.0 | 2 - amino - 4 - methyl - sulphonyl - 1,1' - diphenyl disulphimide. | 40.4 | ---do--- | Do. |
| 21 | 42.45 | 2-amino-4-chloro-4'-methylsulphonyl-1,1'-diphenyl disulphimide. | 37.0 | 2 - amino - 8 - hydroxynaphthalene - 6 - sulphonic acid-N-butyl-N-phenyl amide. | Do. |
| 22 | 43.1 | 2 - amino - 3' - benzoylamino - 1,1' - diphenyl disulphimide. | 30.8 | 2 - amino - 8 - hydroxynaphthalene - 6 - sulphonic acid morpholide. | Do. |
| 23 | 43.1 | ---do--- | 29.4 | 2 - amino - 8 - hydroxynaphthalene - 6 - sulphonic acid-N,N-diethyl amide. | Do. |
| 24 | 40.4 | 3 - amino - 4 - methyl - sulphonyl - 4' - methyl-1,1'-diphenyl disulphimide. | 37.0 | 2 - amino - 8 - hydroxynaphthalene - 6 - sulphonic acid-N-butyl-N-phenyl amide. | Do. |
| 25 | 54.4 | 3-amino-4-(4''-methylbenzene sulphonyl)-4' - methyl - sulphonyl - 1,1' - diphenyl disulphimide. | 32.8 | 2 - amino - 8 - hydroxynaphthalene - 6 - sulphonic acid-N-methyl-N-phenyl amide. | Bluish red. |
| 26 | 47.7 | 3 - amino - 4 - methyl - sulphonyl - 4' - carbethoxyamino - 1,1' - diphenyl disulphimide. | 32.8 | ---do--- | Do. |

EXAMPLE 2

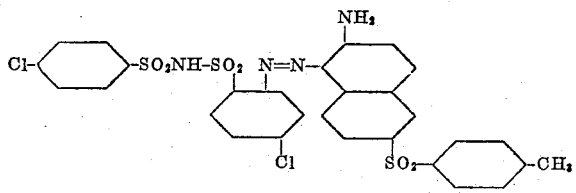

38.1 parts of 2 - amino - 4,4' - dichloro - 1,1' - diphenyl disulphimide in the form of the sodium salt are dissolved in 1000 parts of hot water, 6.9 parts of sodium nitrite are added and the solution is added dropwise at 0–5° while stirring and externally cooling, onto a mixture of 30 parts of concentrated hydrochloric acid and 100 parts of ice. The colourless diazo suspension is stirred for 1 hour at 0–5° and then a little excess nitrous acid is decomposed. The diazo suspension is slowly poured while stirring at 0–10° into a solution of 29.5 parts of 2-amino-6-naphthyl-4′-methyl phenyl sulphone dissolved in 500 parts of glacial acetic acid and 500 parts of ethanol. Coupling occurs quickly and the colour becomes orange. After stirring for 8 hours at 0–10°, the temperature is raised to 60°, 2000 parts of hot water are added and the acid is neutralised to some extent by sprinkling in 80 parts of sodium chloride. The dyestuff is precipitated in the form of the sodium salt with sodium chloride, filtered off under suction, well washed with 5% sodium chloride solution and dried.

The orange dyestuff dissolves in hot water and dyes wool from a neutral to weakly acid bath in pure orange, fast to light shades.

The 2-amino-6-naphthyl-4′-methyl phenyl sulphone is obtained in the following manner: 1.2 mols of pulverised aluminium chloride are added in small portions at usual temperature to a solution of 2-nitronaphthalene-6-sulphochloride in excess abs. toluene. After heating for 4 hours on a water bath at 70° the development of hydrochloride is practically complete. Ice and hydrochloric acid are added and the excess toluene is removed with steam. After cooling, the residue is filtered under suction, the filter residue is washed with water, dried at 100° and recrystallised from alcohol.

The following Table 2 gives further examples of similar monoazo dyestuffs which are produced according to the method described in Example 2 and which dye wool from a neutral to weakly acid bath in fast to light shades also.

EXAMPLE 3

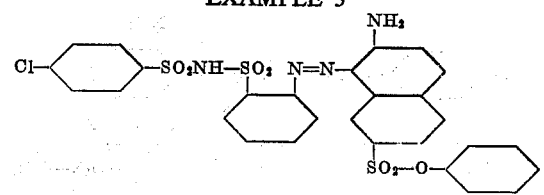

34.7 parts of 2-amino-4′-chloro-1.1′-diphenyl disulphimide in the form of the neutral sodium salt are dissolved in 1000 parts of water, 6.9 parts of sodium nitrite are added and the 40° warm solution is added dropwise to 30 parts of hydrochloric acid and 100 parts of ice at 0–5°. After stirring for 1 hour at 0° and decomposing a little excess nitrous acid, the colourless diazo suspension is poured into a solution of 29.9 parts of 2-aminonaphthalene-7-sulphonic acid phenol ester in 300 parts of glacial acetic acid and 500 parts of ethanol. Coupling occurs immediately and the colour becomes orange. The coupling mixture is stirred for 6 hours, then diluted with 2000 parts of hot water, 100 parts of sodium chloride are added and the precipitated orange dyestuff is filtered off. It is washed neutral on the suction filter with 2% sodium chloride solution and then dried at 80°.

The yellowish-brown dyestuff dissolves in hot water with an orange colour and dyes wool on boiling in a bath containing ammonium sulphate in level fast to light orange shades.

The azo component used is obtained from 2-nitronaphthalene-7-sulphochloride by reacting with phenol while stirring strongly in phenolphthalein alkaline/aqueous solution (pH of the solution=9–11) in the warm and reducing the nitro group to the amino group.

The following Table 3 contains some further similar monoazo dyestuffs produced by the method described in Example 3 which have similar properties.

Table 2

| No. | Parts | Diazo component | Parts | Azo component | Colour of wool dyeing |
|---|---|---|---|---|---|
| 1 | 38.1 | 2 - amino - 3′.4′ - dichloro - 1.1′ - diphenyl disulphimide. | 28.3 | 2 - amino - 6 - naphthyl - phenyl sulphone. | Orange. |
| 2 | 32.6 | 2 - amino - 4′ - methyl - 1.1′ - diphenyl disulphimide. | 31.8 | 2 - amino - 6 - naphthyl - 4′ - chlorophenyl sulphone. | Do. |
| 3 | 32.6 | do | 29.7 | 2 - amino - 7 - naphthyl - 4′ - methyl phenyl sulphone. | Do. |
| 4 | 38.2 | 2 - amino - 5 - acetyl - amino - 4′ - methyl - 1.1′ - diphenyl disulphimide. | 29.7 | do | Do. |
| 5 | 40.4 | 2 - amino - 4 - methyl - sulphone - 4′ - methyl - 1.1′ - diphenyl disulphimide. | 31.1 | 2 - amino - 7 - naphthyl - 3′.4′ - dimethyl phenyl sulphone. | Do. |
| 6 | 34.7 | 2 - amino - 4′ - chloro - 1.1′ - diphenyl disulphimide. | 31.3 | 2 - amino - 8 - hydroxy - 6 - naphthyl - 4′ - methyl - phenyl sulphone. | Red. |
| 7 | 38.1 | 2 - amino - 3′.4′ - dichloro - 1.1′ - diphenyl disulphimide. | 31.3 | do | Do. |
| 8 | 36.1 | 2 - amino - 4 - methyl - 4′ - chloro - 1.1′ - diphenyl disulphimide. | 22.1 | 2 - amino - 5 - naphthyl - methyl sulphone. | Orange. |
| 9 | 32.6 | 2 - amino - 4′ - methyl - 1.1′ - diphenyl disulphimide. | 29.7 | 2 - amino - 5 - naphthyl - 4′ - methyl phenyl sulphone. | Do. |
| 10 | 34.7 | 2 - amino - 4′ - chloro - 1.1′ - diphenyl disulphimide. | 29.7 | 2 - amino - 5 - napthyl - 4′ - methyl phenyl sulphone. | Do. |
| 11 | 43.1 | 2 - amino - 4′ - benzoylamino - 1.1′ - diphenyl disulphimide. | 22.1 | 2 - amino - 5 - naphthyl methyl sulphone. | Do. |
| 12 | 39.9 | 2 - amino - 4′ - carbethoxyamino - 1.1′ - diphenyl disulphimide. | 23.5 | 2 - amino - 7 - naphthyl ethyl sulphone. | Do. |

Table 3

| No. | Parts | Diazo component | Parts | Azo component | Colour of wool dyeing |
|---|---|---|---|---|---|
| 1 | 34.7 | 2-amino-4′-chloro-1.1′-diphenyl disulphimide. | 33.4 | 2-aminonaphthalene-6-sulphonic acid-4′-chlorophenol ester. | Orange. |
| 2 | 34.7 | do | 31.3 | 2-aminonaphthalene-6-sulphonic acid-4′-methyl phenol ester. | Do. |
| 3 | 34.7 | do | 31.3 | 2-aminonaphthalene-5-sulphonic acid-4′-methyl phenol ester. | Do. |
| 4 | 34.7 | do | 35.6 | 2-aminonaphthalene-5-sulphonic acid-4′-tert. butyl phenol ester. | Do. |
| 5 | 34.7 | do | 32.9 | 2 - amino - 8 - hydroxynaphthalene - 6 - sulphonic acid-4′-methyl phenol ester. | Yellowish red. |
| 6 | 38.3 | 2-amino-5-acetylamino-4′-methyl - 1.1′ - diphenyl disulphimide. | 31.5 | 2 - amino - 8 - hydroxynaphthalene - 6 - sulphonic acid phenol ester. | Do. |
| 7 | 41.8 | 2-amino-4-ethyl-sulphonyl-4′-methyl-1.1′-diphenyl disulphimide. | 36.9 | 2-aminonaphthalene-6-sulphonic acid-3′.4′-dichlorophenol ester. | Orange. |

EXAMPLE 4

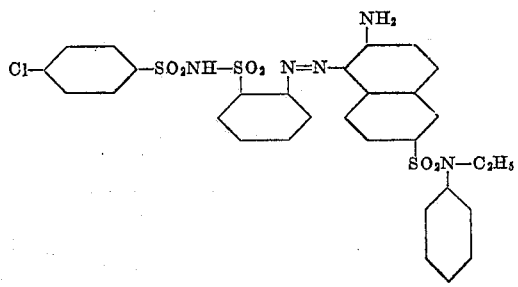

36.1 parts of 2-amino-4-methyl-4'-chloro-1.1'-diphenyl disulphimide in the form of the neutral sodium salt are dissolved in 500 parts of hot water, 6.9 parts of sodium nitrite are added, the solution is cooled to about 40° and then added dropwise at 0-8° to a mixture of 30 parts of concentrated hydrochloric acid and 100 parts of ice while stirring and externally cooling. The colourless diazo suspension is stirred for an hour at 0-5° and then a little excess nitrous acid is decomposed. The diazo suspension is then slowly poured while stirring at 0-10° into a solution of 32.6 parts of 2-aminonaphthalene-6-sulphonic acid-N-ethyl-N-phenyl amide dissolved in 300 parts of glacial acetic acid and 500 parts of ethanol. Coupling occurs quickly and the colour becomes orange. After stirring for 8 hours at 0-10°, the temperature is raised to 50°, 1000 parts of water are added and the acid is partly neutralised by sprinkling in 100 parts of sodium carbonate. The dyestuff is precipitated with the aid of sodium chloride as the sodium salt, it is filtered off under suction, washed well with 5% sodium chloride solution and dried.

The orange dyestuff dissolves well in hot water and dyes wool from a neutral to weakly acetic acid bath in pure orange fast to light shades.

The following Table 4 contains some further monoazo dyestuffs which are produced with the number of parts given of the components according to the method described in Example 4. These dyestuffs have similar properties.

of ammonium sulphate in 3000 parts of water. The bath is brought to the boil within 45 minutes and boiled for 1½ hours while moving the wool well. The wool is then rinsed and dried. In this way, a very level, pure, yellowish-red wool dyeing is obtained which is distinguished by very good fastness properties.

The dyestuffs obtained according to all the other examples can be dyed on to wool in a similar manner.

What I claim is:

1. A monoazo dyestuff which is free from sulphonic acid and carboxylic acid groups and corresponds to the formula:

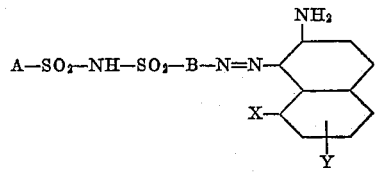

wherein A represents a radical selected from the group consisting of the benzene and naphthalene series, B represents a benzene radical which is bound to the azo linkage in ortho-position relative to a sulphonyl group, X represents a member selected from the group consisting of H and OH, and Y represents a sulphonyl substituent selected from the group consisting of —$SO_2$-alkyl, —$SO_2$-[mononuclear carbocyclic aryl], —$SO_2$—O-[mononuclear carbocyclic aryl] and —$SO_2$—R radicals, wherein R represents a secondary amino group.

2. A monoazo dyestuff which is free from sulphonic acid and carboxylic acid groups and corresponds to the formula:

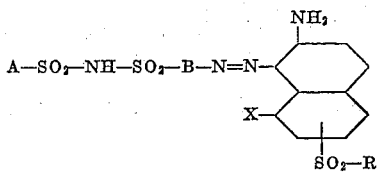

wherein A represents a radical selected from the group consisting of the benzene and naphthalene series, B represents a benzene radical, the bonds sown being in o-

*Table 4*

| No. | Parts | Diazo component | Parts | Azo component | Colour of wool dyeing |
|---|---|---|---|---|---|
| 1 | 38.1 | 2-amino-4.4'-dichloro-1.1'-diphenyl disulphimide. | 32.6 | 2-aminonaphthalene-5-sulphonic acid-N-ethyl-N-phenyl amide. | Orange. |
| 2 | 36.2 | 2-aminophenyl-2'-naphthyl disulphimide. | 31.0 | 2-aminonaphthalene-6-sulphonic acid-N-ethyl-N-β-hydroxyethyl amide. | Do. |
| 3 | 44.5 | 2-amino-5-benzoylamino-4'-methyl-1.1'-diphenyl disulphimide. | 31.2 | 2-aminonaphthalene-7-sulphonic acid-N-methyl-N-phenyl amide. | Do. |
| 4 | 38.1 | 2-amino-3'.4'-dichloro-1.1'-diphenyl disulphimide. | 31.2 | ----do---- | Do. |
| 5 | 38.1 | ----do---- | 27.8 | 2-aminonaphthalene-7-sulphonic acid-N.N-diethyl amide. | Do. |
| 6 | 38.1 | ----do---- | 38.9 | 2-aminonaphthalene-6-sulphonic acid-N-methyl-N-p-methyl sulphonyl phenyl amide. | Do. |
| 7 | 38.1 | ----do---- | 31.2 | 2-aminonaphthalene-5-sulphonic acid-N-methyl-N-phenyl amide. | Do. |
| 8 | 46.6 | 3-amino-4.p-toluylsulphonyl-1.1'-diphenyl disulphimide. | 31.2 | ----do---- | Do. |
| 9 | 41.8 | 2-amino-4-ethylsulphonyl-4'-methyl-1.1'-diphenyl disulphimide. | 31.2 | ----do---- | Do. |
| 10 | 31.1 | 2-amino-4'-sulphamido-1.1'-diphenyl disulphimide. | 30.8 | 2-aminonaphthalene-7-sulphonic acid-N-benzyl-N-phenyl amide. | Do. |
| 11 | 40.4 | 3-amino-4-methyl sulphonyl-4'-methyl-1.1'-diphenyl disulphimide. | 38.8 | ----do---- | Do. |
| 12 | 40.4 | ----do---- | 38.6 | 2-aminonaphthalene-6-sulphonic acid-N.N-dicyclohexyl amide. | Do. |
| 13 | 47.7 | 3-amino-4-methyl sulphonyl-4'-carbethoxyamino-1.1'-diphenyl disulphimide. | 27.8 | 2-aminonaphthalene-5-sulphonic acid-N.N-diethyl amide. | Do. |
| 14 | 40.35 | 2-amino-4'-chloroacetylamino-1.1'-diphenyl disulphimide. | 29.2 | 2-aminonaphthalene-7-sulphonic acid morpholide. | Do. |
| 15 | 43.1 | 2-amino-3'-benzoylamino-1.1'-diphenyl disulphimide. | 29.2 | ----do---- | Do. |

EXAMPLE 5

100 parts of previously well wetted wool are entered at 40° into a dyebath containing 2 parts of the monoazo dyestuff obtained according to Example 1 and 5 parts position to each other, X represents a member selected from the group consisting of H and OH, and R represents the radical of a secondary amino group.

3. A monoazo dyestuff which is free from sulphonic acid and carboxylic acid groups and corresponds to the formula:

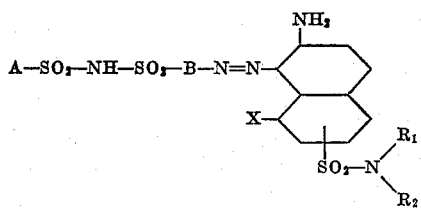

wherein A represents a radical selected from the group consisting of unsubstituted and chlorine substituted and methyl substituted radicals of the benzene series, B represents a benezene radical, the bonds shown being in o-position to each other, X represents a member selected from the group consisting of H and OH, $R_1$ represents a lower alkyl radical and $R_2$ represents a phenyl radical.

4. The monoazo dyestuff which corresponds to the formula:

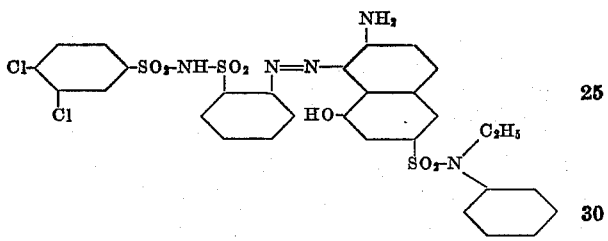

5. The monoazo dyestuff which corresponds to the formula:

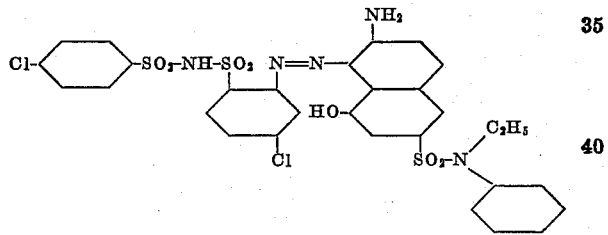

6. The monoazo dyestuff which corresponds to the formula:

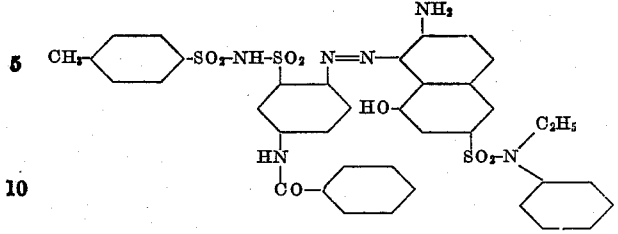

7. The monoazo dyestuff which corresponds to the formula:

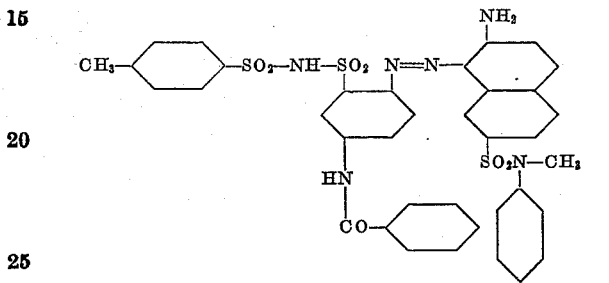

8. The monoazo dyestuff which corresponds to the formula:

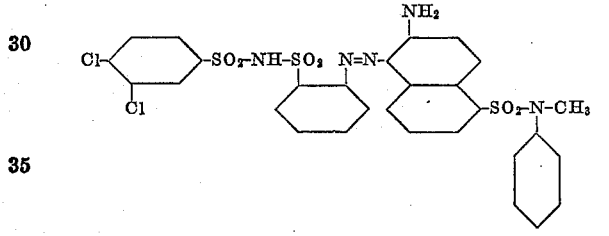

References Cited in the file of this patent
UNITED STATES PATENTS

| | | |
|---|---|---|
| 1,749,836 | Neelmeier et al. | Mar. 11, 1930 |
| 1,903,599 | Schweitzer | Apr. 11, 1933 |
| 2,358,519 | Krebser et al. | Sept. 19, 1944 |